United States Patent Office 3,679,643
Patented July 25, 1972

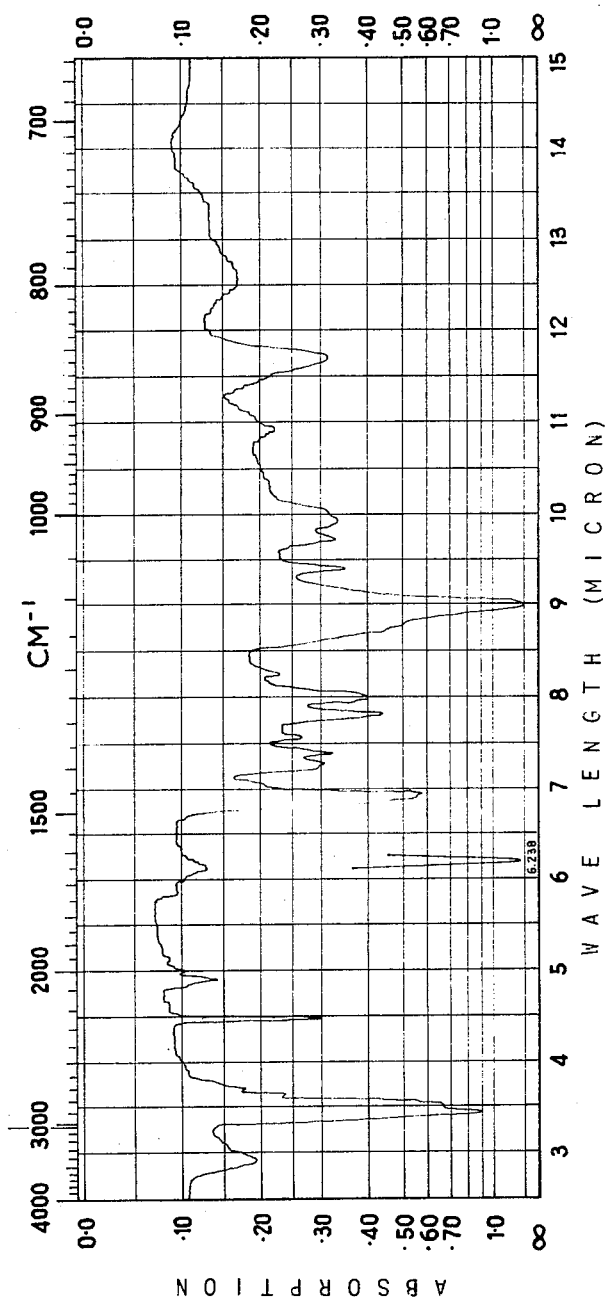

3,679,643
COPOLYMERS OF ACRYLONITRILE WITH NITROGENOUS MONOMERS AND PROCESS FOR THEIR PREPARATION
Giulio Natta, Ferdinando Danusso, and Paolo Ferruti, Milan, Italy, assignors to Montecatini Edison S.p.A., Milan, Italy
Filed Feb. 13, 1969, Ser. No. 798,949
Claims priority, application Italy, Feb. 16, 1968, 12,832/68
Int. Cl. C08f 15/22
U.S. Cl. 260—85.5 R  5 Claims

ABSTRACT OF THE DISCLOSURE

A new composition of matter comprising a copolymer of acrylonitrile and an enamine having the general formula:

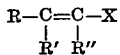

wherein R is an aliphatic, cycloaliphatic or aromatic hydrocarbon residue, R' and R" may be the same or different, and are aliphatic, cycloaliphatic or aromatic hydrocarbon residues or hydrogen and X is a radical derived from a secondary amine by removal of the hydrogen atom bound to the nitrogen are disclosed. Copolymer is prepared by reacting acrylonitrile and the enamine in the presence of a free radical initiator.

BACKGROUND OF THE INVENTION

(1) Field of the invention

This invention pertains to the field of copolymers of acrylonitrile with nitrogenous monomers. More particularly, it pertains to copolymers prepared from enamines and acrylonitrile in the presence of a free radical initiator.

(2) Description of the prior art

The copolymerization of acylonitrile with N - vinylamines, such as N-vinylmorpholine is known. (See, e.g., U.S. Patent 3,126,363.) It is also known that aldehyde derived enamines of the general formula

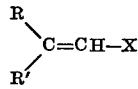

and ketone derived enamines of the general formula

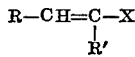

wherein R is a hydrocarbon residue, R' is a hydrocarbon residue or hydrogen, and X is a radical derived from a secondary amine by the removal of the hydrogen atom bound to the nitrogen, react with acrylonitrile in the absence of catalysts, at temperatures varying between room temperature and 100° C., depending on the nature of the enamine, and in solvents, such as dioxane and the like, to form dimers. (See, e.g., G. Stork, A. Brizzolara, H. Landesmann, J. Szmuszkovicz, R. Terrel, J. Am. Chem. Soc., 85, 207 (1963); K. G. Brannook; A. Bell, R. D. Burpitt, C. A. Kelly, J. Org. Chem. 26, 625 (1961); I. Fleming, J. Harley Mason, J. Chem. Soc., 1964, 2165.)

The aldehyde derived enamines, under such conditions, form cyclic thermostable dimers, while the ketone derived enamines, at low temperatures give rise to cyclic dimers of low thermal stability, while at higher temperatures, they yield cyanoethylated enamines.

SUMMARY OF THE INVENTION

We have discovered a new polymeric composition and a method for preparing such composition. The composition is suitable for use as a dyeing modifier for synthetic fibers, as a textile finishing agent, and the like.

More particularly, we have found that enamines of the general formula:

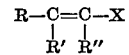

wherein R is a hydrocarbon residue, R' and R" are hydrocarbon residues or hydrogen, and X is a radical derived from a secondary amine by removal of the hydrogen atom bound to the nitrogen, may be copolymerized with acrylonitrile by reacting the enamine with acrylonitrile in the presence of a free radical initiator. We have further discovered that such copolymerization may be successfully carried out either in a solvent or in bulk.

Solvents suitable for the process are hydrocarbons (for instance heptane, octane, benzene, toluene), alcohols (e.g., methanol, ethanol) or ketones (e.g., acetone, methylethylketone).

BRIEF DESCRIPTION OF THE DRAWING

The sole figure is an infrared spectrum of the copolymer formed by the catalytic reaction of acrylonitrile and 1-N-morpholinobutene-1.

DESCRIPTION OF THE PREFERRED EMBODIMENTS

We have found that unique polymeric materials may be prepared from the reaction of enamines having the general formula:

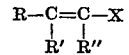

wherein R is an aliphatic, cycloaliphatic or aromatic hydrocarbon residue, R' and R" may be the same or different, and are aliphatic, cycloaliphatic or aromatic hydrocarbon residues or hydrogen, and X is a radical derived from a secondary amine by removal of the hydrogen atom bound to the nitrogen, with acrylonitrile, this reaction being carried out in the presence of a free radical initiator.

Enamines particularly suitable for use in our invention are 1-N-morpholinobutene-1, 1 - N - piperidinobutene-1, 1-N-(N'-benzyl)piperazinobutene-1 and 1-N-morpholinocyclopentene.

Suitable free radical initiators include azo compounds such as azo-di-isobutyronitrile, and organic or inorganic peroxides, and such as benzoyl peroxide, lauryl peroxide, hydrogen peroxide. We have found it preferable to use such initiators in amounts from about 0.01% to about 10% by weight based on the mixture of monomers.

Temperatures within the range of from about 10° C. to about 100° C. are advantageously employed for the copolymerization. The reaction time may vary within wide limits, e.g. between 30 minutes and 100 hours, preferably between 1 hour and 48 hours, but it is normally at least 15 minutes. We have generally found it preferable to carry out the reaction in a non-aqueous medium and under an inert atmosphere.

The thus produced copolymers are generally amorphous (as shown by X-ray examination) white powders which are soluble in chloroform, acetone, methylethylketone, acetonitrile, dimethyl sulfoxide, dimethyl formamide, and pyridine, and which are insoluble in n-heptane, methyl alcohol, ethyl alcohol and water.

The copolymers are also soluble in dilute aqueous acids, and they may be precipitated from these solutions by the addition of bases such as NaOH or ammonia. Examination of the I.R. spectra and intrinsic viscosities of the copolymers before and after dissolution in aqueous acids and reprecipitation with bases showed no structural change in the materials.

The percentage of enamine units present in the copolymer may be determined by potentiometric titration with p-toluene-sulfonic acid in a 4:1 solution of acetonitrile and glacial acetic acid. This percentage increases with increasing amounts of enamine in the monomeric mixture. The enamine percentage in the copolymer, however, levels off at a value somewhat below 50% and further increase in the enamine content of the monomeric mixture have no effect on the perecentage. When enamines such as 1-N-piperidino-butene-1 and 1-N-morpholino-butene-1 are used, the maximum percentage of enamine in the copolymer is 70% by weight.

The intrinsic viscosities reported in the examples have been measured on the product dissolved in acetone, at 30° C., by means of a capillary viscometer.

The following examples further illustrate our invention.

EXAMPLE 1

A mixture of 42.29 g. of 1-N-morpholinobutene-1, 15.9 g. of acrylonitrile (molar ratio 1:1) and 1.968 g. of azo-di-isobutyronitrile was placed in a 100 cc. vial. The mixture was cooled to −20° C., and the air was removed by repeated evacuations and by flushing with nitrogen, after which the vial was sealed under nitrogen. The reaction vessel was then immersed in a thermostatically heated bath at 60° C. for 24 hours, with intermittent agitation. The vial was then broken the raw reaction product was diluted with acetone, and an excess of methanol was added. 28 g. of acrylonitrile and 1-N-morpholino-butene-1 copolymer, containing 32% by mols of units derived from the enamine, corresponding to about 56% by weight were obtained.

The copolymer had an intrinsic viscosity at 30° C. equal to 0.1 dl./g. The I.R. spectrum of the copolymer is shown in the figure. The copolymer undergoes thermal decomposition at about 250° C. as shown by thermogravimetric measurements in air, using an Adamel CT 59 thermobalance, Chevenard-Joumier system, with heating speed of 150° C./hour.

EXAMPLE 2

A copolymer was prepared using the same procedure as that described in Example 1 with the same quantities of monomers and 0.492 g. of azo-di-isobutyronitrile. The reaction time was 96 hours. The raw product was processed in exactly the same manner as that described in Example 1. 19.5 g. of copolymer, essentially identical to that of Example 1, were obtained.

Table I shows the variation in copolymer yield with variation in initiator concentration for the above described reaction.

TABLE I

| Percent initiator: | Copolymer yield percent |
|---|---|
| 0.25 | 23 |
| 0.50 | 28 |
| 0.75 | 34 |
| 1.0 | 39 |
| 2.0 | 44 |
| 3.0 | 49 |
| 4.0 | 49 |

The change in initiator concentration had no detectable effect on the properties of the product. The starting copolymerization rate, by a first approximation is proportional to the concentration of the initiator.

EXAMPLE 3

Using the same procedure and quantities as described in Example 1 and conducting the reaction at 50° C. for 48 hours, 20 g. of copolymer were obtained which had the same composition as the copolymer of Example 1 and a [$\eta$] measured in acetone at 30° C. of 0.11 dl./g.

We further determined that the copolymerization rate doubled for each 10° C. increase in temperature. Furthermore the maximum copolymer yield attained decreased when operating below 50° C. Also the molecular weight of the copolymer, expressed as intrinsic viscosity, increased slightly when the copolymerization was conducted at lower temperatures.

Table II shows the variation in copolymer composition effected by variation in enamine content of the monomeric mixture for 1-N-morpholino-butene-1.

TABLE II

Mol percent 1-N-morpholino-butene-1

| Monomeric mixture: | Copolymer |
|---|---|
| 1.57 | 9.42 |
| 1.91 | 12.0 |
| 3.08 | 16.4 |
| 7.97 | 22.6 |
| 10.8 | 25.2 |
| 15.9 | 27.1 |
| 24.0 | 28.8 |
| 29.5 | 29.1 |
| 37.6 | 30.8 |
| 53.4 | 32.2 |
| 69.2 | 34.1 |
| 77.9 | 35.0 |
| 92.7 | 36.5 |

The molecular weight of the copolymers thus obtained was approximately constant. The copolymerization rate decreases considerably at percentages of enamine greater than 80 mol percent in the starting monomeric mixture.

EXAMPLE 4

A mixture of 27.69 g. of 1-N-piperidino-butene-1, 10.55 g. of acrylonitrile (molar ratio=1:1) and 1.31 g. of azo-diisobutyronitrile was introduced to a 100 cc. vial. This mixture was cooled to −20° C., the air was removed by repeated evacuation and flushing with nitrogen, and the vial was then sealed under nitrogen. The vial was immersed in a thermostatically heated bath kept at 60° C. for 30 hours with intermittent agitation.

The vial was then broken, and the raw reaction product was diluted with acetone and an excess of methanol. 10 g. of acrylonitrile and 1-N-piperidino-butene-1 copolymer, which contained 35% by mols of enamine units, corresponding to about 60% by weight, were obtained. The copolymer had an intrinsic viscosity in acetone at 30° C. of about 0.1 dl./g. The maximum obtainable copolymer yield decreased considerably with initiator concentrations less than 1%.

The properties of the copolymer did not vary appreciably with initiator concentration and the starting copolymerization rate was directly proportional to the concentration of the initiator.

By varying the reaction temperature, all other conditions remaining the same, the reaction rate approximately doubled for an increase of 10° C. in reaction temperature. The maximum obtainable copolymer yield decreased at temperatures below 50° C. The molecular weight, expressed as intrinsic viscosity, increased slightly when the copolymerization was conducted at a lower temperature.

Table III shows the variation in copolymer composition effected by variation in enamine content of the monomeric mixture for 1-N-piperidino-butene-1.

TABLE III

Mol percent 1-N-piperidino-butene-1

| Monomer | Polymer |
|---|---|
| 2.48 | 14.25 |
| 4.89 | 18.6 |
| 10.4 | 21.2 |
| 13.5 | 23.2 |
| 16.0 | 24.0 |
| 22.8 | 24.4 |
| 27.9 | 27.0 |
| 37.1 | 30.2 |
| 47.4 | 33.4 |
| 60.0 | 34.6 |
| 66.8 | 35.8 |
| 72.5 | 36.4 |
| 78.5 | 37.2 |
| 84.2 | 37.2 |
| 89.0 | 38.0 |
| 95.6 | 38.8 |

EXAMPLE 5

A mixture of 44 cc. of 1-benzylpiperazine, 200 cc. of benzene, 18 cc. of butyl aldehyde and 30 g. of anhydrous $K_2CO_3$ was introduced into a 500 cc. flask. This mixture was heated to reflux; it was then cooled and filtered, and the filtrate was evaporated under 20 mm. Hg. The residue was fractionally distilled, and the fraction that boils at 109° C./0.1 torr was collected. A 75% yield of 1-N(N'-benzyl)piperazino-butene-1 was obtained.

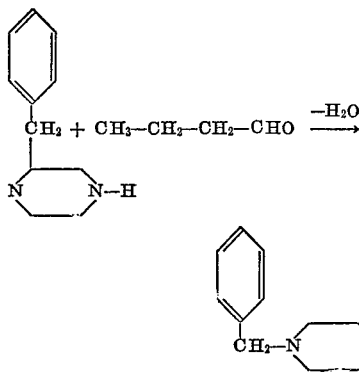

The analysis showed: Calc. for $C_{15}H_{22}N_2$ (percent): C, 78.30; H, 9.56; N, 12.20. Found (percent): C, 78.21; H, 9.56; N, 12.39.

A mixture of 5.3 g. of acrylonitrile, 23.0 g. of 1-N(N'-benzyl)piperazino-butene-1 (molar ratio=1:1) and 0.6 g. of azo-di-isobutyronitrile was placed in a 100 cc. vial. The air was removed and the vial sealed under nitrogen in the manner previously described. The sealed vial was then immersed in a 60° C. constant temperature bath for 24 hours. The vial was then broken and the raw reaction product was diluted with acetone, and reprecipitated in an excess of methanol. 9 g. of a copolymer containing 32 mol percent of units derived from the enamine, corresponding to about 67% by weight were obtained. The copolymer had an $[\eta]$ in acetone at 30° C. of 0.09 dl./g.

Relationships similar to those discussed previously for the 1-N-morpholino-butene-1 and 1-N-piperidino-butene-1 with respect to reaction rate, temperature, initiator concentration, copolymer yield and enamine concentration exist for 1-N(N'-benzyl)piperazino-butene-1.

EXAMPLE 6

A mixture of 4 g. of 1-N-morpholino-cyclopentene, 3.5 g. of acrylonitrile and 100 mg. of azo-di-isobutyronitrile was placed in a 25 cc. vial. This mixture was then cooled to −20° C., the air was removed by repeated evacuation and flushing with nitrogen and the vial was sealed under nitrogen; the vial was then immersed for 48 hours in a 60° C. constant temperature bath. The vial was then broken and the raw reaction product was diluted with pyridine and thereafter precipitated by the addition of an excess of n-heptane. 1 g. of copolymer was obtained, which was soluble in dilute acids and precipitable therefrom base without undergoing changes in structure. The copolymer had a $[\eta]$ in pyridine at 30° C. of 0.09 dl./g.

EXAMPLE 7

A mixture of 5 g. of an acrylonitrile/1-N-piperidino-butene-1 copolymer, prepared according to the procedure described in Example 4, and 95 g. of polypropylene, prepared with stereospecifiic catalysts, having an $[\eta]$ of 1.61 measured in tetrahydronaphthalene at 135° C., an ash content of 0.018% and a residue after heptane extraction of 97.1% was spun on a laboratory melt-spinning device (with 4 holes of 0.8 mm. diameter, 16 mm. height), at 240° C. The resulting fibers exhibited satisfactory dyeing properties with the following plastosoluble dyes:

Tersetile yellow SRL (ACNA)
Foron yellow RGFL (Sandoz)
Foron orange GFL (Sandoz)
Dispersol red PP (ICI)
Palanil rubine BN (BASF)
Cibacet blue RF (CIBA)
Duranol blue PP (ICI)

Similar dye results were obtained with a fiber spun from a mixture of 5 g. of the acrylonitrile/1-N-morpholino-butene-1 copolymer described in Example 1 and 95 g. of polypropylene.

Variations can, of course, be made without departing from the spirit and scope of the invention.

Having thus described our invention, what we desire to secure by Letters Patent and hereby claim is:

1. A copolymer useful as a dyeing modifier for synthetic resins, said copolymer consisting essentially of acrylonitrile and less than about 50 mol percent of an enamine selected from the group consisting of 1-N-morpholino-butene-1, 1 - N-piperidino-butene-1, 1-N(N'-benzyl)piperazino-butene-1 and 1-N-morpholino-cyclopentene.

2. A process for preparing the copolymer of claim 1, said process comprising reacting, in the presence of a free radical initiator, acrylonitrile and an enamine selected from the group consisting of 1-N-morpholino-butene-1, 1-N-piperidino-butene-1, 1-N(N'-benzyl)piperazino-butene-1 and 1-N-morpholino-cyclopentene.

3. The process as claimed in claim 2, wherein the free radical initiator is an azo compound and is present in an amount from about 0.01 to about 10% by weight based on the weight of the starting materials.

4. The process as claimed in claim 3, wherein the azo compound is azo-di-isobutyronitrile.

5. The process as claimed in claim 2, wherein the reaction temperature is in the range of from about 10° C. to about 100° C. and the reaction time is at least about 15 minutes.

References Cited

UNITED STATES PATENTS

| 2,700,027 | 1/1955 | Brunson | 260—85.5 AM |
| 2,841,574 | 7/1958 | Foster | 260—85.5 R |
| 2,910,445 | 10/1959 | Mock et al. | 260—85.5 AM |
| 2,769,793 | 11/1956 | Ham | 260—88.3 R |
| 3,530,120 | 9/1970 | Hirseh | 260—89.7 N |
| 3,546,190 | 12/1970 | De Vries | 260—88.3 R |

HARRY WONG, JR., Primary Examiner

U.S. Cl. X.R.

117—139.5, 140; 260—29.6, 30.2, 30.8, 32.4, 32.6, 32.8, 33.8, 88.3, 89.7, 897